May 14, 1946. W. WELLSTEIN 2,400,448
MOTOR MOUNTING
Filed Dec. 7, 1944 3 Sheets-Sheet 1

Inventor
Wilhelm Wellstein
By
Carlson, Pitzner, Hubbard & Wolfe
Attorneys.

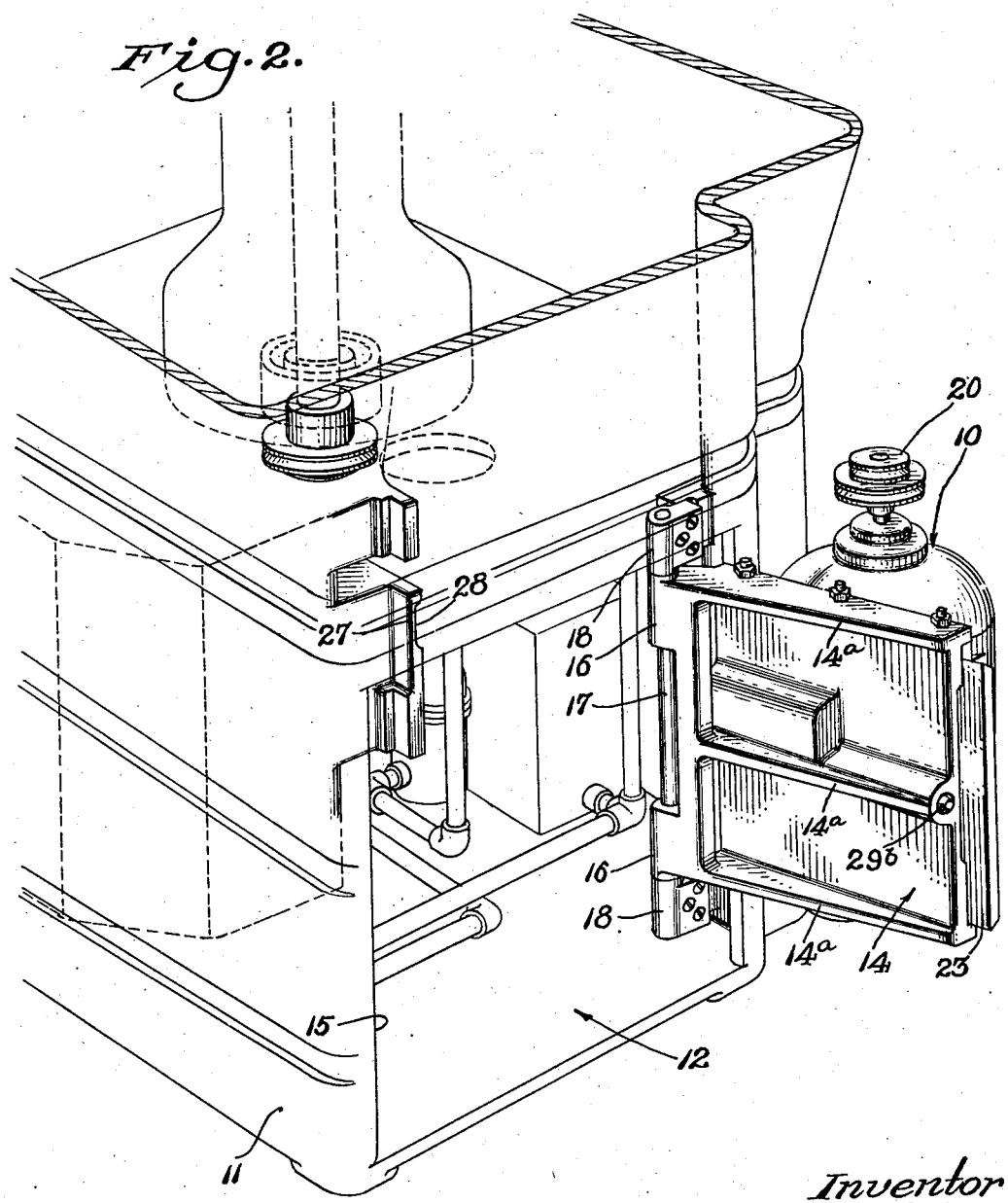

May 14, 1946.  W. WELLSTEIN  2,400,448
MOTOR MOUNTING
Filed Dec. 7, 1944  3 Sheets-Sheet 3
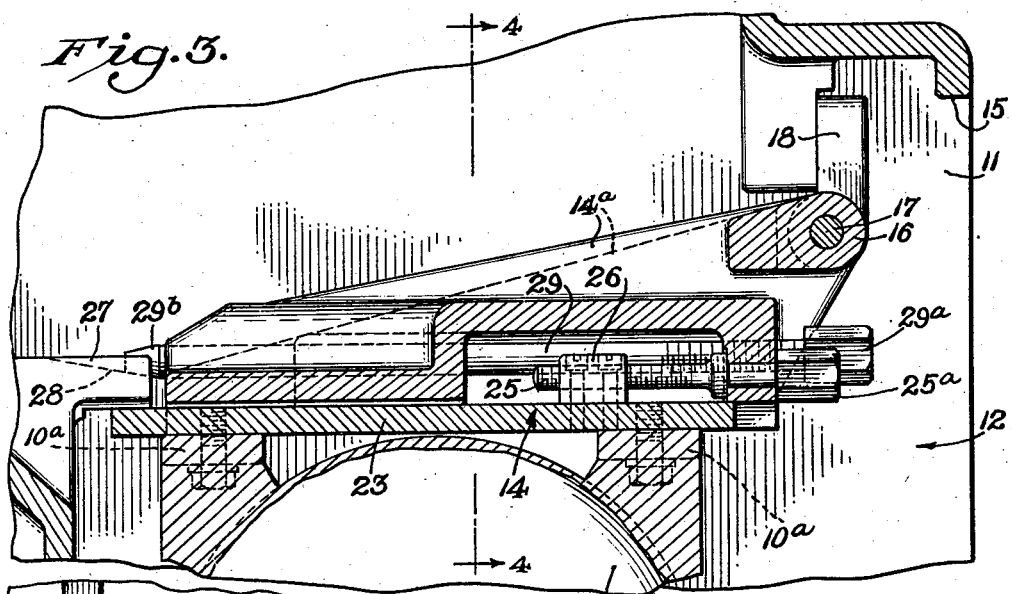
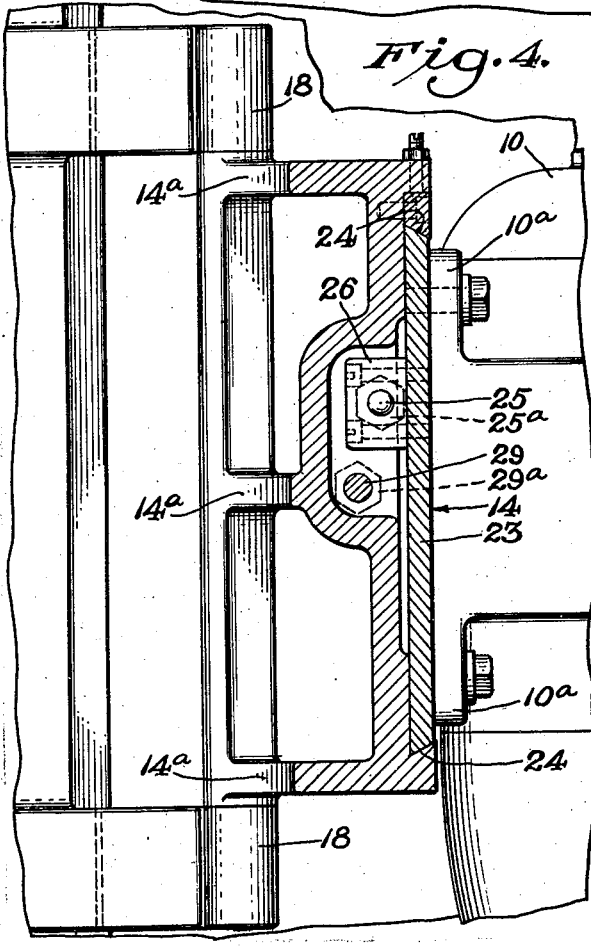
Inventor
Wilhelm Wellstein
BY
Attorneys.

Patented May 14, 1946

2,400,448

UNITED STATES PATENT OFFICE 2,400,448

MOTOR MOUNTING

Wilhelm Wellstein, Detroit, Mich., assignor to Ex-Cell-O Corporation, Detroit, Mich., a corporation of Michigan Application December 7, 1944, Serial No. 567,031

4 Claims. (Cl. 248—23)

The present invention pertains to a mounting for electric drive motors of machine tools or other machines. Such motors are often housed within a motor compartment defined in the base or column of the machine. In that location they are effectually protected and enclosed during operation, and are disposed for close coupling to driven elements of the machine. A motor so located more often than not, however, constitutes a heavy and unwieldy obstruction to access to conduits, pipes, valves, gears, switches, and the other items, which frequently surround it in a veritable labyrinth within the housing, especially in automatic or semi-automatic machines of any substantial complication. Moreover, the motor itself is difficult of access for purposes of inspection and repair.

Generally stated, the object of the present invention is to provide a novel motor mounting of such character that an electric drive motor housed in a machine base or the like can be swung out of the housing with complete freedom and ease of motion to clear the adjacent machine elements within the housing for free access and to locate the motor itself where it is clear of all obstruction.

A further object is to provide a swinging type motor mounting embodying a novel arrangement for wedgingly locking the mounting firmly in motor-operating position.

Still another object is to provide a mounting of the general type indicated and incorporating an arrangement for adjusting the tension of a belt which forms a disconnectable drive connection from the motor when it is in operating position.

Further objects and advantages of the invention will become apparent as the following description proceeds, taken in connection with the accompanying drawings in which:

Fig. 2 is a view similar to Fig. 1, but showing the motor swung out of the machine base or housing to afford free access to the interior of the housing and to the motor.

Fig. 3 is a fragmentary horizontal sectional view through the motor support and associated elements, with the support located in the motor-operating position of Fig. 1.

Fig. 4 is a detail sectional view taken substantially along the line 4—4 in Fig. 3.

Figure 1:
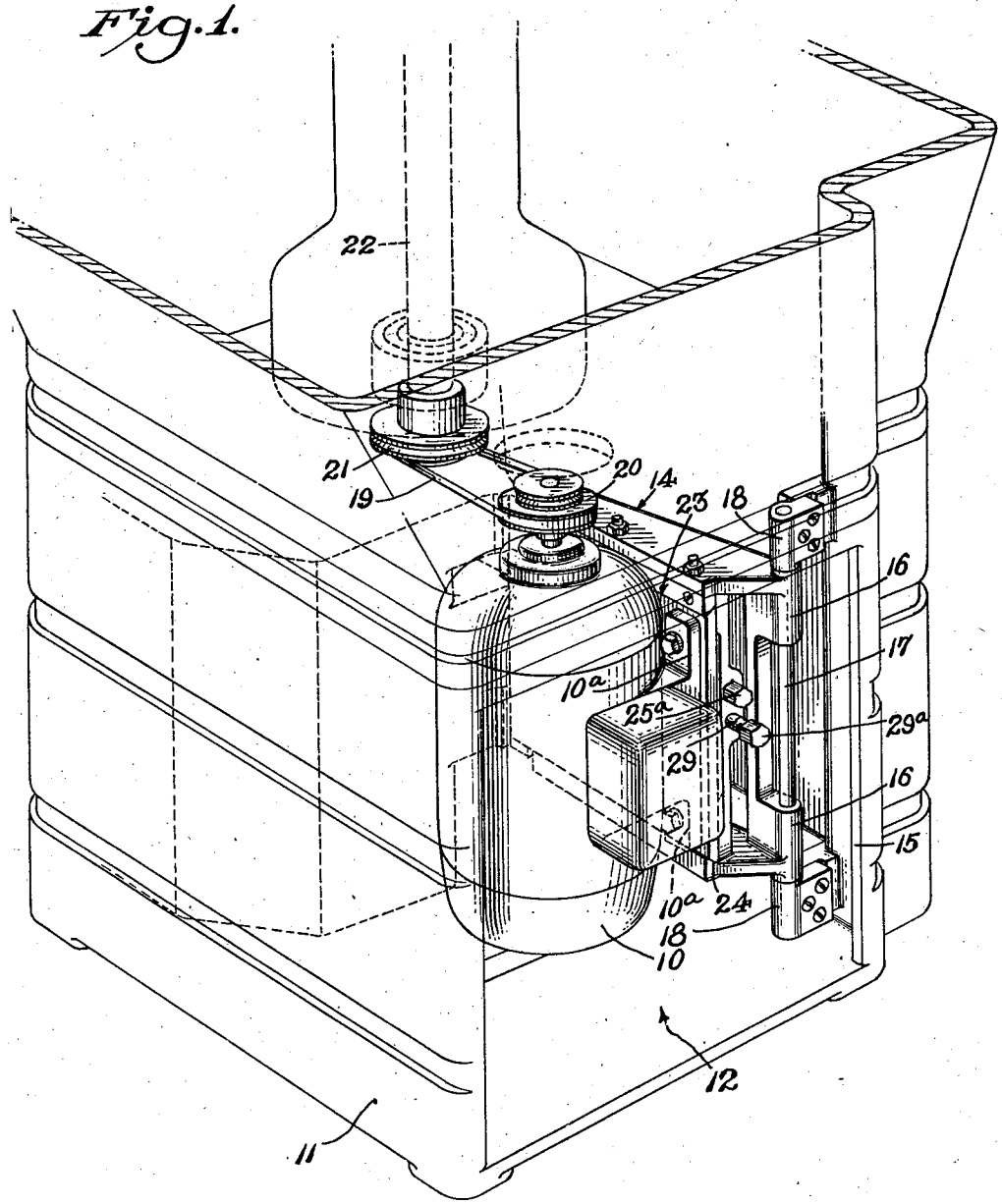
Figure 1 is a perspective view taken from the rear side of a machine equipped with a motor mounting arrangement embodying the present invention, the motor in this instance being shown as positioned within the housing in condition for operation and the housing itself being shown in phantom.

Referring more particularly to the drawings, the invention has been shown as applied to the mounting of an electric drive motor 10 normally housed in the base 11 of a machine tool, such for example as a tool bit grinder. As the following description proceeds, it will be apparent to those skilled in the art that the present invention is applicable to the mounting of motors in many other types and forms of machines and machine tools. Accordingly, there is no intention to limit the invention to the particular application of the same herein illustrated. On the contrary, the intention is to cover all applications, adaptations and alternative constructions falling within the spirit and scope of the invention as expressed in the appended claims.

In the instant embodiment, the machine base 11 is a generally rectangular cast metal shell suitably webbed and reenforced, and constitutes a housing defining an interiorly located motor compartment 12. Within this compartment 12 is normally located not only the motor 10, but all of the multitude of other elements necessary to actuation of the machine. More often than not, the walls of such a compartment are literally covered with piping, conduits, valves, switches and such. Gear trains, shafts and the like are also contained within the housing. Detailing of the same for the particular machine shown is unnecessary, since they may and usually do take different specific form in each different type of machine. The point here to be noted is that in any such machine employing a base or housing with a smooth unobstructed exterior, the interior is likely to be crowded with a maze of intricately related parts. The drive motor is usually one of the bulkiest items in such a compartment. Being large and heavy, dragging it out would, in the absence of the novel arrangement herein disclosed, be a most difficult matter, particularly since its location is almost inevitably such as to make attachment of a chain hoist impossible. But without removing the motor, repair and maintenance of either it or, more particularly, of the surrounding machine parts requires the service man to be something of a contortionist as well as expert mechanic.

Pursuant to the aim of the present invention, provision has been made for swinging the motor 10 clear of the compartment 12 so as to expose both the motor and the interior of the compartment for easy and unobstructed access. For that purpose, a flat vertically disposed supporting leaf 14 is arranged to carry the motor 10 and is pivoted to swing about a vertical axis located adjacent one side edge of the opening 15 in the rear side of the base 11. Such leaf 14 has suitable reenforcing webs 14a and a pair of integral gudgeons 16 on its rear edge journaled on a hingle pintle or pin 17 carried by brackets 18 rigid with the machine base 11. The supporting leaf 14 is thus pivoted to swing about the axis of the pin 17 from the motor-operating position of Fig. 1 (in which the leaf projects forwardly within the compartment 12 along one side of the latter) to a withdrawn or outthrust position for the motor in which the leaf projects generally rearwardly from the machine base as shown in Fig. 2.

Utilization of a vertical axis of swing for the leaf 14 is important in that with such an arrangement the weight of the motor is borne at all times, and in its entirety, by the pivotal supports 16, 17, 18 for the leaf. At no time does the service man have to support any part of the motor weight in moving it.

A disconnectable form of drive connection is employed between the motor 10 and machine element or elements which it drives, such connection preferably being a belt. In the present instance, an endless V-belt 19 is led over the motor pulley 20 and a driven pulley 21 secured to a spindle 22 which may, for example, be the grinding wheel spindle in the machine shown. The motor 10 is, in the present arrangement, mounted with its shaft disposed vertically.

To accommodate adjustment of the tension in the belt 19, as well as to facilitate removal of the belt from the motor pulley 20 when swinging the motor out of the base 11, provision is made for positional adjustment of the motor on the supporting leaf 14 in a direction transaxial of the motor. For that purpose, motor feet 10a are bolted to a slide 23 in the form of a rectangular flat plate which is mounted in dovetailed guides 24 on the supporting leaf 14 to shift endwise of the latter or, in other words, transaxially of the motor. The slide 23 is moved along its guideways 24 by rotation of an adjusting screw 25 threaded in the leaf 14 and having its inner end rotatably secured in a bracket 26 fixed to the slide. The squared outer end 25a of this screw projects beyond the end of the supporting leaf 14 in position for ready gripping of the same by a wrench.

The motor 10 may be of several horsepower capacity and, consequently, a very sturdy and effectual locking arrangement is required for fixing it rigidly in place during operation of the motor if excessive vibration is to be avoided. In the present instance, provision has been made for wedgingly locking the leaf 14 to an interiorly located rib 27 integral with the machine base 11 (see Fig. 3). The leaf 14 and slide 23 are dimensioned so that the forward end portion of the slide will overlie and abut solidly against the adjacent side face of the rib 27 when the leaf is swung into the housing in motor-operating position. A shallow recess 28 is fashioned in the opposite side face of the rib 27, and the tapered nose 29b of a locking screw 29 is arranged to be projected into this recess and wedge against the bottom wall of the latter. The locking screw 29 is, like the slide adjusting screw 25, threaded in the leaf 14 and has a squared end 29a projecting in position for engagement by a wrench.

The operation of the disclosed apparatus will in general be clear from the foregoing. By way of brief recapitulation, it may be assumed first of all that the motor 10 is to be located in operating position. In such case, the supporting leaf 14 is swung into the position shown in Fig. 1, in which the motor is located within the compartment 12. The locking screw 29 is rotated to advance its tapered nose portion 29b into the recess 28, thereby wedging the rib 27 between the locking screw nose and forward edge portion of the slide 23 so that the slide, motor and leaf are rigidly held against displacement or vibration. The belt 19 is shifted onto the two pulleys 20 and 21, and the screw 25 adjusted to tension the belt to a desired degree. Thereafter, the machine may be operated in the usual manner and the belt tension may be adjusted from time to time by the screw 25 as may be required.

Whenever it is necessary to have access to the machine elements located in the compartment 12, or to work on the motor 10, the motor is swung out of the compartment. In so doing, the service man has only to turn the adjusting screw 25 to loosen the belt 19 so that it can be slipped off of the pulley 20 and then back off the locking screw 29. Thereupon the leaf 14 is free to swing outward about its pivot pin 17, carrying the motor with it. Current supply leads to the motor may be provided in the form of an ordinary flexible cable (not shown) so that they do not impede the free movement of the motor. In swinging the motor into the clear, the leaf 14 is normally swung through an arc of about 180°, or even a little more if desired. Once the motor 10 is thus removed from the compartment 12, a crawl space is afforded so that the service man can get into the compartment and inspect or repair the various other machine elements housed in it.

Should it be desired to alter the tension in the belt 19 by adjusting screw 25 after the leaf 14 has been clamped in place, it is desirable to loosen such clamping slightly before turning the screw 25. That is for the reason that in course of such clamping the slide 23 is pressed tightly against the rib 27 and movement of the slide is necessary in shifting the motor to alter belt tension. Accordingly, the locking screw 29 should be backed off slightly preliminary to turning the adjusting screw 25.

I claim as my invention:

1. The combination of a housing structure defining an interiorly located motor compartment having an opening in one side, a generally flat supporting leaf hinged along one edge on said housing to swing about a vertical axis adjacent one side of said opening, said leaf being swingable from a first position in which it projects into said compartment substantially at right angles to the plane of said one side of said compartment through an angle of substantially 180° to a second position in which said leaf projects outward from the open wall of said structure substantially at right angles to the latter, an electric motor fixed to the face of said leaf which is forward during swing of said leaf from said first to said second position, means for releasably locking said leaf rigid with said housing when said leaf is in said first position, and means for drivingly connecting said motor to a driven machine element when said leaf is in said first position.

2. The combination of a housing structure defining an interiorly located motor compartment having an opening in one side, a support having a slide mounted in guideways thereon for adjusting movement along said guideways, an electric motor fixed to said slide with the motor disposed transversely of the path of movement of said slide along said guideways, means including an endless belt for connecting said motor to a driven element within said housing, shift of said slide along its guideways serving to adjust the tension in said belt, and means pivoting said support to swing in an arcuate path about a vertical axis between alternate positions in which said motor is located respectively inside and outside said compartment, said support passing through said opening in moving from one position to the other.

3. The combination of a housing structure defining an interiorly located motor compartment having an opening in one side, an electric drive motor and a supporting structure therefor locating the motor with its axis substantially vertical, means pivoting said supporting structure to swing in an arcuate path about a vertical axis between alternate first and second positions in which said motor is disposed respectively inside and outside said compartment, said motor passing through said opening in moving from one position to the other, means including an endless belt for forming a disconnectable drive connection from said motor to a driven element within said housing when said supporting structure is in said first position, said housing presenting an interiorly located rib rigid therewith and positioned for abutment of said supporting structure against one side face thereof when in said first position, whereby to locate said supporting structure accurately in such first position, and means for releasably clamping said supporting structure to said rib.

4. The combination of a housing structure defining an interiorly located motor compartment having an opening in one side, a support having a slide mounted in guideways thereon for adjusting movement along said guideways, an electric motor fixed to said slide with the motor disposed transversely of the path of movement of said slide along said guideways, means pivoting said support to swing in an arcuate path between alternate first and second positions in which said motor is disposed respectively inside and outside said compartment, said motor passing through said opening in moving from one position to the other, means including an endless belt for forming a disconnectable drive connection from said motor to a driven element within said housing when said support is in said first position, said housing presenting an interiorly located rib rigid therewith and positioned for abutment of said slide against one side face thereof when in said first position, whereby to locate said support and slide accurately in such first position, a pair of screws rotatably threaded in said support, one of said screws being connected to said slide for adjusting the latter positionally along said guideways, and the other screw having a tapered nose portion positioned for projection into contact with the side face of said rib opposite said one face thereof, whereby to wedgingly clamp said rib between said slide and said tapered screw nose and thereby hold said slide rigidly against displacement.

WILHELM WELLSTEIN.